United States Patent
Peled

(10) Patent No.: US 12,361,078 B2
(45) Date of Patent: Jul. 15, 2025

(54) VALUE-BASED ONLINE CONTENT SEARCH ENGINE

(71) Applicant: Time Economy LTD., Kiryat Ono (IL)

(72) Inventor: Amir Peled, Odense (DK)

(73) Assignee: Time Economy LTD., Kiryat Ono (IL)

( * ) Notice: Subject to any disclaimer, the term of this patent is extended or adjusted under 35 U.S.C. 154(b) by 0 days.

(21) Appl. No.: 17/875,469

(22) Filed: Jul. 28, 2022

(65) Prior Publication Data
US 2024/0037161 A1   Feb. 1, 2024

(51) Int. Cl.
*G06F 16/9535* (2019.01)
*G06F 16/9538* (2019.01)

(52) U.S. Cl.
CPC ...... *G06F 16/9535* (2019.01); *G06F 16/9538* (2019.01)

(58) Field of Classification Search
CPC ............ G06F 16/9535; G06F 16/9538; G06Q 30/0254; G06Q 30/0256; G06Q 30/0269; G06Q 30/0271; G06Q 30/0282; G06Q 30/0623; G06Q 30/0631; G06Q 30/0641; G06Q 2220/00
See application file for complete search history.

(56) References Cited

U.S. PATENT DOCUMENTS

| | | | |
|---|---|---|---|
| 10,592,513 B1 * | 3/2020 | Cionca | H04W 4/21 |
| 11,113,726 B1 | 9/2021 | Viswanath | |
| 11,386,377 B1 * | 7/2022 | Brini | G06N 20/00 |
| 11,475,082 B1 | 10/2022 | Beard et al. | |
| 2005/0108204 A1 * | 5/2005 | Gordon | G06F 16/22 |
| 2009/0019385 A1 * | 1/2009 | Khatib | G06F 3/04817 |
| | | | 715/765 |
| 2010/0198628 A1 * | 8/2010 | Rayner | G06Q 30/02 |
| | | | 707/723 |
| 2010/0323785 A1 | 12/2010 | Motyl et al. | |
| 2015/0127473 A1 | 5/2015 | Simhon et al. | |
| 2016/0018158 A1 * | 1/2016 | Yokoo | G05B 15/02 |
| | | | 700/275 |

(Continued)

OTHER PUBLICATIONS

Official Action Dated Oct. 12, 2023 from the US Patent and Trademark Office Re. U.S. Appl. No. 18/213,282. (10 pages).

(Continued)

*Primary Examiner* — Ann J Lo
*Assistant Examiner* — Fatima P Mina

(57) ABSTRACT

A method of searching and recommending online consumable items based on quantified benefit value, comprising receiving one or more benefit parameters defined by one or more users with respect to one or more domains of interest, searching for a plurality of consumable items relating to the interest domain(s) which are published in one or more online resources, analyzing a benefit label associated with each consumable items which is indicative of one or more quantified benefit values of the respective consumable item expressed in one or more metrics—time value, monetary value, and/or life improvement value, selecting one or more of the consumable items based on a correspondence between their quantified benefit values and the benefit parameter(s), and instructing one or more client devices used by the one or more users to present the selected consumable item(s) for consumption by the one or more users.

18 Claims, 7 Drawing Sheets

(56) References Cited

U.S. PATENT DOCUMENTS

| | | | |
|---|---|---|---|
| 2016/0162913 A1* | 6/2016 | Linden | G06Q 30/0202 |
| | | | 705/7.31 |
| 2016/0171044 A1 | 6/2016 | Mihalik et al. | |
| 2016/0267601 A1* | 9/2016 | Kundu | G06Q 50/01 |
| 2017/0024685 A1* | 1/2017 | DiSorbo | G06Q 10/06398 |
| 2019/0130039 A1* | 5/2019 | Fang | G06F 16/9535 |
| 2019/0143097 A1* | 5/2019 | John | A61N 1/0456 |
| | | | 607/149 |
| 2019/0325507 A1* | 10/2019 | Rowley | G06Q 30/0641 |
| 2020/0342482 A1* | 10/2020 | Frohwein | G06Q 30/0214 |
| 2021/0026901 A1 | 1/2021 | Aher et al. | |
| 2021/0241177 A1* | 8/2021 | Wang | G06N 20/00 |
| 2023/0117568 A1 | 4/2023 | Prasad et al. | |
| 2023/0154609 A1* | 5/2023 | Kwatra | G06N 20/00 |
| | | | 705/2 |

OTHER PUBLICATIONS

Notice of Allowance Dated Dec. 14, 2023 from the US Patent and Trademark Office Re. U.S. Appl. No. 18/213,282. (7 pages).

* cited by examiner

VALUE-BASED ONLINE CONTENT SEARCH ENGINE

FIELD AND BACKGROUND OF THE INVENTION

The present invention, in some embodiments thereof, relates to searching and recommending online published consumable content and items to users, more specifically, but not exclusively, to searching and recommending online published consumable content and items to users based on their quantified value to the users.

Search engines have become a basic tool for practically any person having access to online resources as they may be used for practically any type of information gathering application, action and/or need.

The search engines may receive search queries, typically outlined and expressed in linguistic terms, phrases, words, characters, numbers, and/or the like and may carry out a search through online content published by online content resources, typically connected to the internet in attempt to find online items which match the search query.

SUMMARY OF THE INVENTION

According to a first aspect of the present invention there is provided a method of searching and recommending online consumable items based on quantified benefit value, comprising using one or more processors for executing a search engine configured for:

Receiving one or more benefit parameters defined by one or more users with respect to one or more domains of interest.

Searching for a plurality of consumable items relating to the one or more interest domains which are published in one or more online resources.

Analyzing a benefit label associated with each of the plurality of consumable items which is indicative of one or more quantified benefit values of the respective consumable item expressed in one or more metrics which is a member of a group consisting of: time value, monetary value, and life improvement value.

Selecting one or more of the plurality of consumable items based on a correspondence between the one or more quantified benefit values of each of the one or more consumable items and the one or more benefit parameters.

Instructing the one or more client devices used by the one or more users to present the selected one or more consumable items for consumption by the one or more user.

According to a second aspect of the present invention there is provided a system for recommending online consumable items based on quantified benefit value, comprising a memory for storing program code of a search engine and one or more processors coupled to the memory. The one or more processors are configured to execute the program code. The program code comprising:

Code instructions to receive one or more benefit parameter defined by one or more user with respect to one or more domain of interest.

Code instructions to search for a plurality of consumable items relating to the one or more interest domain which are published in one or more online resources.

Code instructions to analyze a benefit label associated with each of the plurality of consumable items which is indicative of one or more quantified benefit value of the respective consumable item expressed in one or more metric which is a member of a group consisting of: time value, monetary value, and life improvement value.

Code instructions to select one or more of the plurality of consumable items based on a correspondence between the one or more quantified benefit value of the one or more consumable item and the one or more benefit parameters.

Code instructions to instruct the one or more client device used by the one or more user to present the selected one or more consumable item for consumption by the one or more user.

In an optional implementation form of the first and/or second aspects, a ranking score is computed for each of the one or more selected consumable items and instructing the one or more client devices to present the one or more selected consumable items in an order according to its ranking score.

In a further implementation form of the first and/or second aspects, the benefit label of one or more of the plurality of consumable items is generated automatically based on analysis of content relating to the one or more consumable items. The content is a member of a group consisting of: textual content, visual content and audible content.

In a further implementation form of the first and/or second aspects, the benefit label of the one or more consumable items is generated automatically using one or more Machine Learning models (ML) trained to compute the one or more quantified benefit values for the one or more consumable items based on content analysis and/or context analysis.

In an optional implementation form of the first and/or second aspects, the one or more ML models are further trained using training samples generated based on user feedback.

In a further implementation form of the first and/or second aspects, the benefit label of one or more of the plurality of consumable items is adjusted according to user feedback received from one or more users presented with the one or more consumable items.

In a further implementation form of the first and/or second aspects, the one or more quantified benefit values express one or more of: an amount, a probability, a risk, an impact expectancy, an impact immediacy, an impact duration, and/or an impact scale.

In a further implementation form of the first and/or second aspects, the time value expresses a quantified value of one or more time benefits estimated for the one or more users as result of consuming the respective consumable item. The one or more time benefits are members of a group comprising: saved time, gained time, improvement of time utilization, and/or a return on investment.

In a further implementation form of the first and/or second aspects, the monetary value expresses a quantified value of one or more monetary benefits estimated for the one or more users as result of consuming the respective consumable item. The one or more monetary benefits are members of a group comprising: saved monetary value, earned monetary value, improved liquidity, reduced risk, and/or a return on investment.

In a further implementation form of the first and/or second aspects, the life improvement value expresses a quantified value of improvement and/or risk in one or more life aspects estimated for the one or more users as result of consuming the respective consumable item. T one or more life aspects are members of a group consisting of: physical health, mental health, self-fulfillment, career, education, social skills, mental skills, physical skills, and/or overall life impact.

In an optional implementation form of the first and/or second aspects, the one or more quantified benefit values are adjusted according to one or more user attributes relating to the one or more users. The one or more user attributes are members of a group consisting of: a personal attribute, a geolocation attribute, and/or a timing attribute.

In an optional implementation form of the first and/or second aspects, the selection of the one or more consumable items is adjusted according to one or more user attributes relating to the one or more users. The one or more user attribute is a member of a group consisting of: a personal attribute, a geolocation attribute, a timing attribute, and/or a user setting.

In an optional implementation form of the first and/or second aspects, the selection of the one or more consumable items is adjusted according to one or more consumption patterns of the one or more users. The one or more consumption patterns is identified based on analysis of a plurality of previous recommendations of at least some of the plurality of consumable items to the one or more users.

In an optional implementation form of the first and/or second aspects, the selection of the one or more consumable items is adjusted according to a selection of the one or more consumable items for one or more other users sharing one or more common user attributes with the one or more users.

In a further implementation form of the first and/or second aspects, the plurality of consumable items are members of a group consisting of: a text item, a visual item, an audio item, a product, a service, a travel destination, a residence destination, an experience, an activity, an opportunity, a living condition, and a neural stimulation.

In an optional implementation form of the first and/or second aspects, one or more notifications are transmitted to the one or more users. The one or more notifications are indicative of the one or more consumable items selected based on a correspondence between the one or more quantified benefit values of the one or more consumable items and one or more benefit parameter determined for the one or more users based on one or more previous sessions with the one or more users.

In an optional implementation form of the first and/or second aspects, a description of the one or more consumable items selected for recommendation to the one or more users is shared with one or more other users.

In a further implementation form of the first and/or second aspects, the one or more users define the one or more benefit parameters using a Graphical User Interface (GUI) configured for multi-selection of the one or more benefit parameters and the one or more interest domains in a single user interface action.

In a further implementation form of the first and/or second aspects, the multi-selection is utilized by dragging one or more first visual elements representing the one or more benefit parameters and dropping them over one or more second visual element representing the one or more interest domains or vice versa, dragging the one or more second visual elements and dropping them over the one or more first visual elements.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
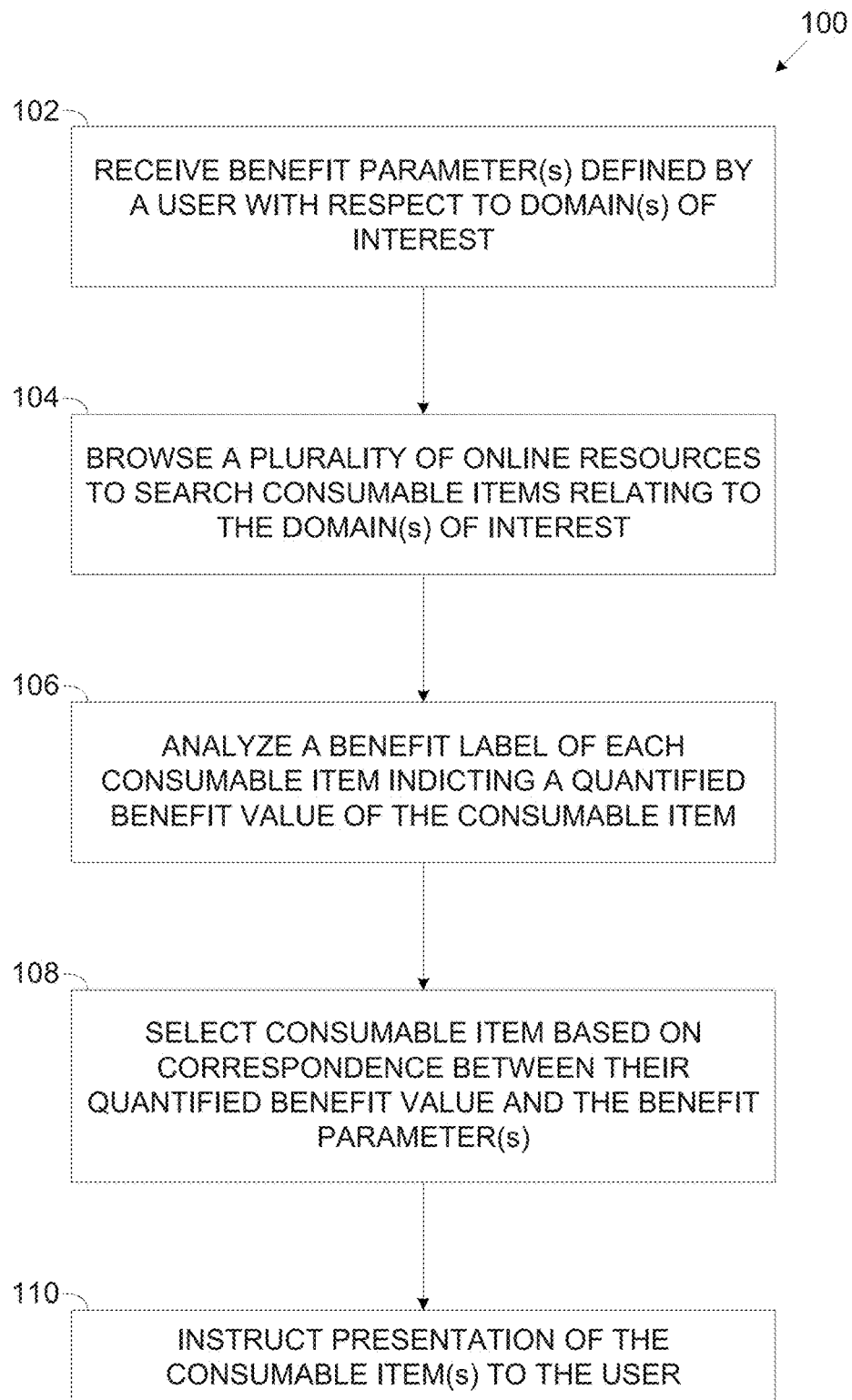
FIG. 1 is a flowchart of an exemplary process of searching and recommending users of consumable items published online based on their quantified value match with users' defined benefits, according to some embodiments of the present invention.

The present invention, in some embodiments thereof, relates to searching and recommending online published consumable content and items to users, more specifically, but not exclusively, to searching and recommending online published consumable content and items to users based on their quantified value to the users.

According to some embodiments of the present invention, there are provided methods, systems and computer program products for searching a plurality of consumable items published online which relate to one or more domains of interest defined by users and recommending one or more selected consumable items to the users based on their value estimated according to their correspondence (match) with benefit parameters defined by the users.

The consumable items may comprise, practically any item published (offered) online which may be consumed by users, for example, used, read, viewed, heard, bought, subscribed, eaten, drank, and/or the like and may include, for example, text items, visual items, audio items, products, services, and/or the like. The consumable items may further comprise higher level items which may relate to one or more experiences, activities, living conditions and/or the like, for example, travel destinations, residence destinations, neural stimulations, and/or the like.

Each of the consumable items may be associated (tagged) with a benefit label indicating of one or more quantified benefit values of the respective consumable item which may be expressed in one or more metrics, for example, time value (e.g., minutes, hours, days, weeks, months, years, etc.), money (monetary) value (e.g. money units, cryptocurrency units, etc.), life improvement and/or risk value, and/or the like.

The benefit labels may be generated for the consumable items manually and/or automatically, for example, using one or more Machine Learning (ML) models trained to compute quantified benefit values for consumable items.

One or more users using associated client devices may interact with a search engine configured to search consumable items published (offered) online and recommend consumable items based on their value to the users.

Optionally, the benefit labels associated with one or more of the consumable items, specifically one or more of the quantified benefit values indicated by the benefit labels, may be adjusted according to one or more user attributes relating to the user, for example, personal attributes, geolocation attributes, timing attributes, and/or the like.

The search engine may be configured to receive one or more benefit parameters provided by the user to define one or more benefits which the user seeks, pursues, and/or desires with respect to one or more domains of interest he indicates and/or selects. In particular, the benefits may be defined by the benefit parameters in terms of value, for example, time, money (monetary value), life improvement and/or risk, and/or the like.

The search engine may browse a plurality of online content publishers which publish consumable items accessible to users and identify one or more consumable items which correspond (match) the benefit parameters with high probability based on correspondence (match) between the quantified values indicated by their associated benefit labels and the benefit parameters defined by the user.

The search engine may select one or more high corresponding (matching) consumable items and recommend them to the user, typically by instructing the client device associated with the user to present the selected consumable item(s), for example, visual display, audio playback, and/or the like.

Optionally, the search engine may further rank the selected consumable items according to their match probability, for example, compute a ranking score accordingly. The search engine may further instruct the client device to present the selected consumable items in order according to their ranking (score).

In response to their presentation, the user may select and consume one or more of the recommended consumable items, for example, read, watch, listen, use, apply, buy, subscribe, and/or the like.

Optionally, the search engine may adjust the selection of the consumable items recommended to the user based on one or more of the user attributes relating to the user, for example, a personal attribute, a geolocation attribute, a timing attribute, a user setting, and/or the like.

Optionally, the search engine may adjust the selection of the consumable items recommended to the user based on one or more consumption patterns identified for the user during one or more previous (past) sessions.

Optionally, the search engine may adjust the selection of the consumable items recommended to the user based on selection of consumable items recommended to one or more other users sharing one or more users attributes with the user. Moreover, the search engine may adjust the selection of the consumable items recommended to the user according to one or more consumption patterns identified to one or more other users.

The value-based search and recommendation engine may present significant advantages and benefits compared to existing search engines.

First, searching for consumable items which match user search parameters based on value may yield significantly more accurate, relevant and/or related search results compared to existing search methods and/or engines which may typically apply linguistic terms matching. Linguistic terms matching may be inherently limited in several aspects. First, exact lingual search terms, phrases and/or words (collectively designated terms), in particular multiple exact lingual terms directed to focus the search may yield search results that are limited to significantly few items which may often may be of little benefit and/or use to the user even if they contain the searched terms. In addition, effectively defining lingual search terms may require high proficiency in the language, a skill that many users may lack. Moreover, using lingual search terms is typically directed to a certain (single) type of consumable item, for example, an online text/video/audio content item, a product, a service, and/or the like.

In contrast, the value-based search engine does not rely on linguistic terms matching and therefore eliminates these inherent limitations. For example, since the search is based on value matching, specifically quantified (benefit) values, defined by the benefit search parameters and indicated by the benefit labels of the consumable items, which may be expressed in quantitative terms, the search and hence the search results may be highly more accurate, relevant, focused and/or to the point with respect to the benefit search parameters which may accurately define in numerical terms what each user is looking for and/or what he is interested in. In addition, since the benefit parameters defining the search are expressed in basic time, money and/or life improvement/risk terms, users with only basic lingual skills may be able to define highly accurate searches with no significant linguistic proficiency. Also, since the search is based on quantified values matching with no restriction to any specific type of consumable items, the search engine is not limited to search and recommend any specific type of consumable item but instead may search for any type of consumable item characterized by quantified values matching those defined by the user.

Overcoming these limitations may significantly improve the technology of online search engines by simplifying and shortening interaction with the user while increasing the search quality thus significantly improving the user experience.

Moreover, searching for matching consumable items based on comparison between their quantified benefit value and the benefit parameters both expressed in numerical values may be much more simple, fast and less resource demanding compared to the existing methods which rely on an elaborate linguistic terms comparison which is resource intensive in terms of computing resources, storage resources, computing time and/or the like. Using the value-based search engine instead of the linguistic based existing search engines may therefore significantly reduce the computing resources utilized for the search.

Furthermore, generating the benefit labels for the consumable items regardless of their specific descriptive attributes, for example, type, representation, features, characteristics, consumption (use) mode, and/or the like may serve to establish a common reference, specifically a value-based reference enabling straight forward search which is oblivious to the actual underlying consumable items. In addition, based on the benefit labels of the consumable items, users may be able to quantify the actual value and/or benefit of the consumable items in significantly objective terms even when comparing items having little and possibly no common characteristics and thus traditionally incomparable.

In addition, customizing the search and recommendation results per user based on his user attributes may significantly increase accuracy and/or relevancy of the recommended consumable items. Tailoring and adjusting the search and recommendation results per user based on his consumption patterns and/or based on consumption patterns identified for similar users sharing one or more users attributes with him may further increase accuracy and/or relevancy of the recommended consumable items. Customizing and tailoring the search and recommendation results may therefore further improve the user experience of the user.

Also, transmitting notifications to the users to indicate of matching consumable items even while the users are not actively engaged in search sessions may further improve the technology of online search engines by improving the user experience of the users who may receive value-based match results without having to actively initiate a search.

According to some embodiments of the present invention, the search engine interacts with the users via a Graphical User Interface (GUI) configured to support multi-selection of the benefit parameters and the domains of interest in a single user interface action. For example, the GUI may be designed to display one or more first visual elements (e.g., symbol, icon, shape, text, etc.) representing benefit parameters and one or more second visual elements representing domains of interest. As such, the user may select both the benefit parameters and the domain of interest in a single action by dragging one or more of the first visual elements and dropping them on (over) one or more of the second visual elements.

The single-action multi-selection GUI may present significant advantages and benefits compared to existing GUIs, in particular GUIs of existing search engines.

First, in order to get accurate results using the existing linguistic match based search engines, the users may need to define an elaborate and complex search query comprising many lingual terms which is obviously an effort and/or time consuming task. In contrast using the single-action multi-selection GUI may significantly reduce the effort and/or time invested by the users to initiate an effective and efficient search based on multiple search value terms defined in a single user action with the GUI. The single-action multi-selection GUI may therefore significantly improve the technology of online search engines by providing a simple user interface while preserving his ability to define multiple search terms thus increasing comfort, interest, attraction, and/or enthusiasm of the user which may also increase user retention. The single-action multi-selection GUI may be of particular benefit for improving the user experience of users using small scale client devices such as, for example, smartphones, smart watches, and/or the like having limited user interfaces, for example, few or even no keys, small scale screen, and/or the like. The single-action multi-selection GUI may further significantly improve the user experience of disable users who may be limited in their ability to manipulate the HMI of their client device.

Moreover, the single-action multi-selection GUI may facilitate a clear and intuitive view of the benefit parameters and the domains of interest available for selection while supporting an extremely large space of search options which may also significantly improve the technology of online search engines.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of searching and recommending users of consumable items published online based on their quantified value match with users' desired benefits, according to some embodiments of the present invention.

An exemplary process 100 may be executed by a search engine for searching a plurality of consumable items published (offered) online which relate to one or more domains of interest defined by users and recommending one or more selected items to the users.

In particular, each of the plurality of consumable items may be associated (tagged) with a benefit label indicating its quantified value which may be expressed in one or more metrics, for example, time, money, life improvement and/or risk, and/or the like.

The search engine may therefore select one or more of the related consumable items found in the online search based on a correspondence (match) between their quantified value and one or more benefit parameters defined by the users which indicate the befits they wish to address, gain, and/or consider.

Figure 2:
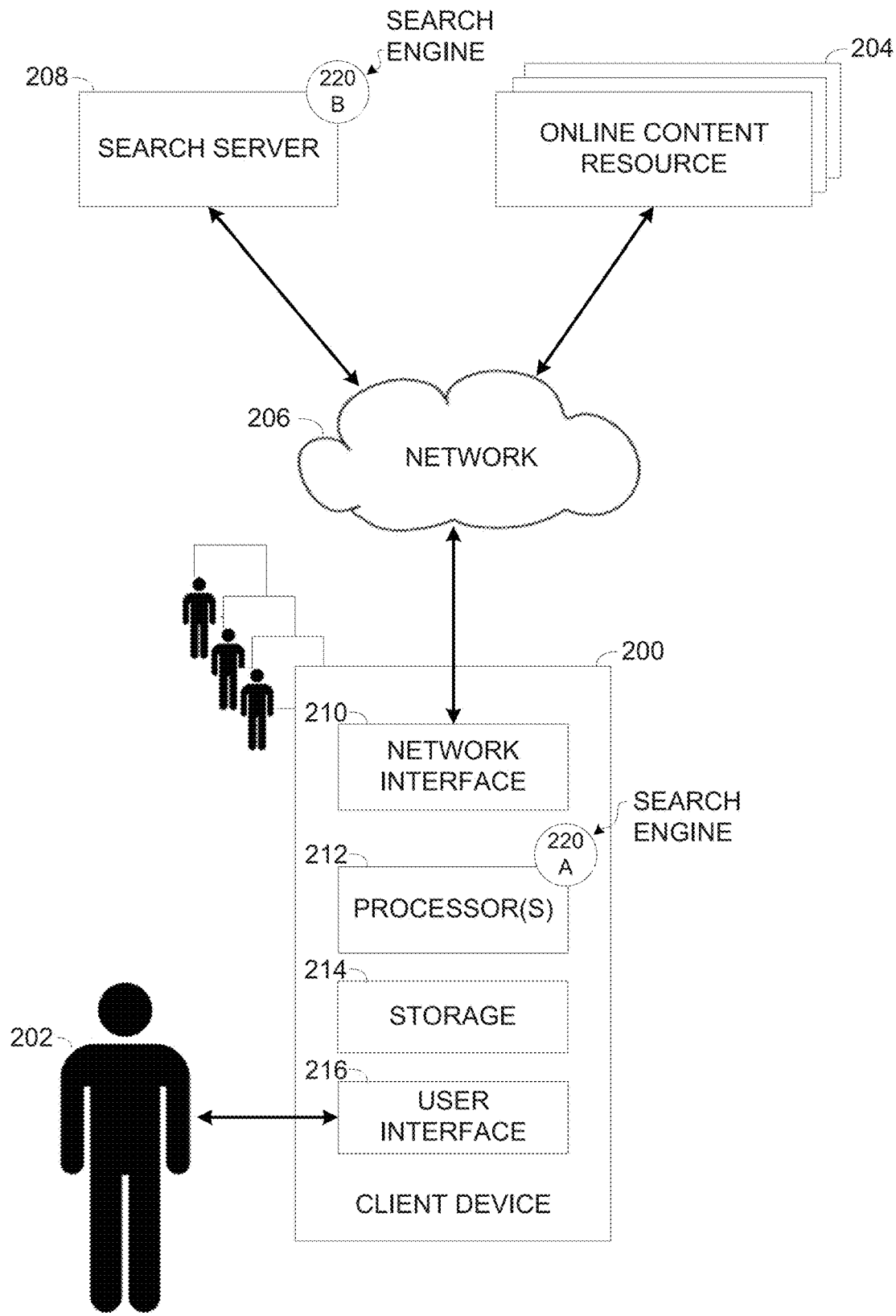
FIG. 2 is a schematic illustration of an exemplary system for searching and recommending users of consumable items published online based on their quantified value match with users' defined benefits, according to some embodiments of the present invention.
Figure 3A:
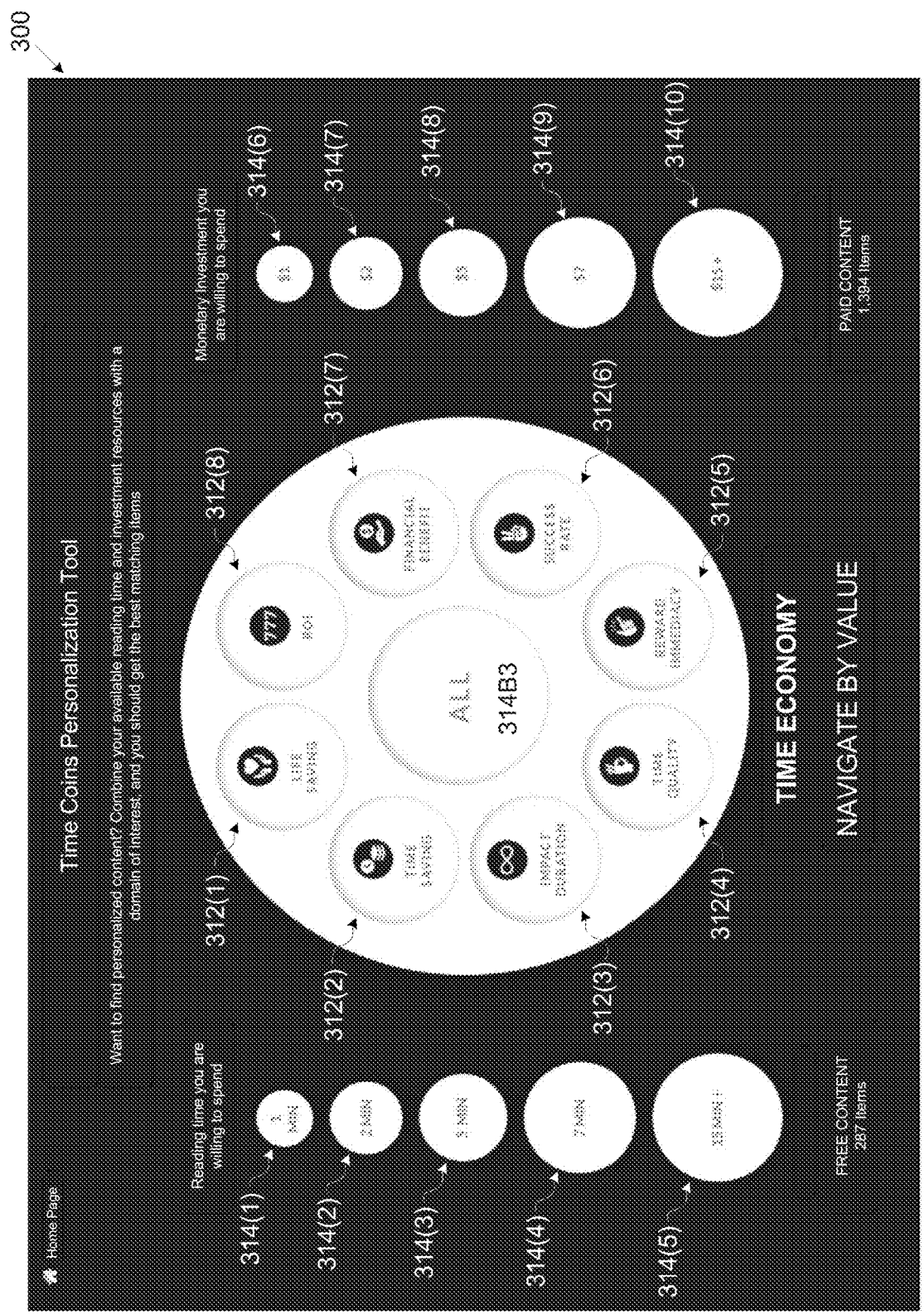
FIG. 3A, FIG. 3B, FIG. 3C, and FIG. 3D are screenshots of an exemplary GUI of a value-based search and recommendation engine configured to search and recommend users of consumable items published online based on their quantified value match with users' defined benefits, according to some embodiments of the present invention.
Figure 3B:
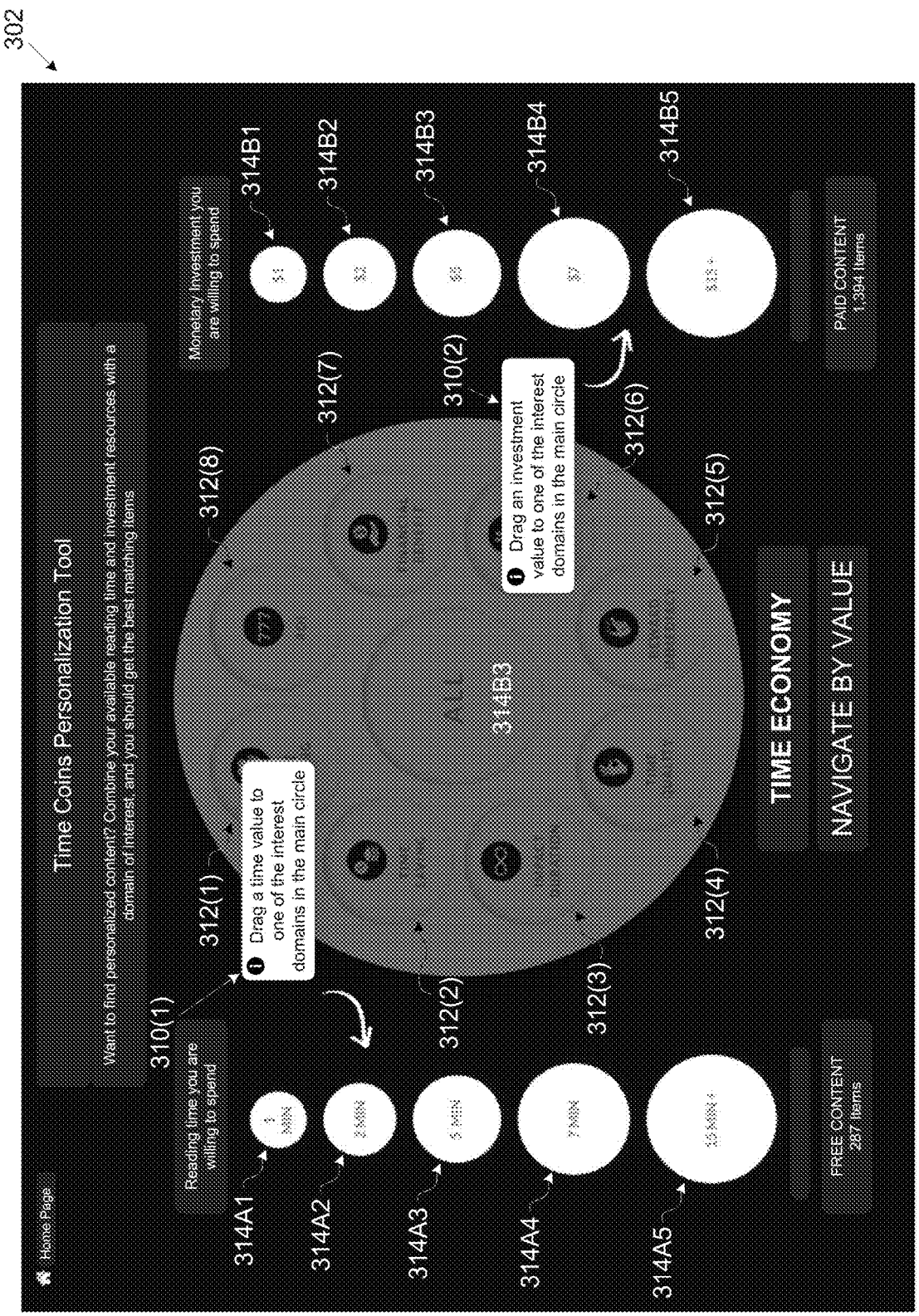
Figure 3C:
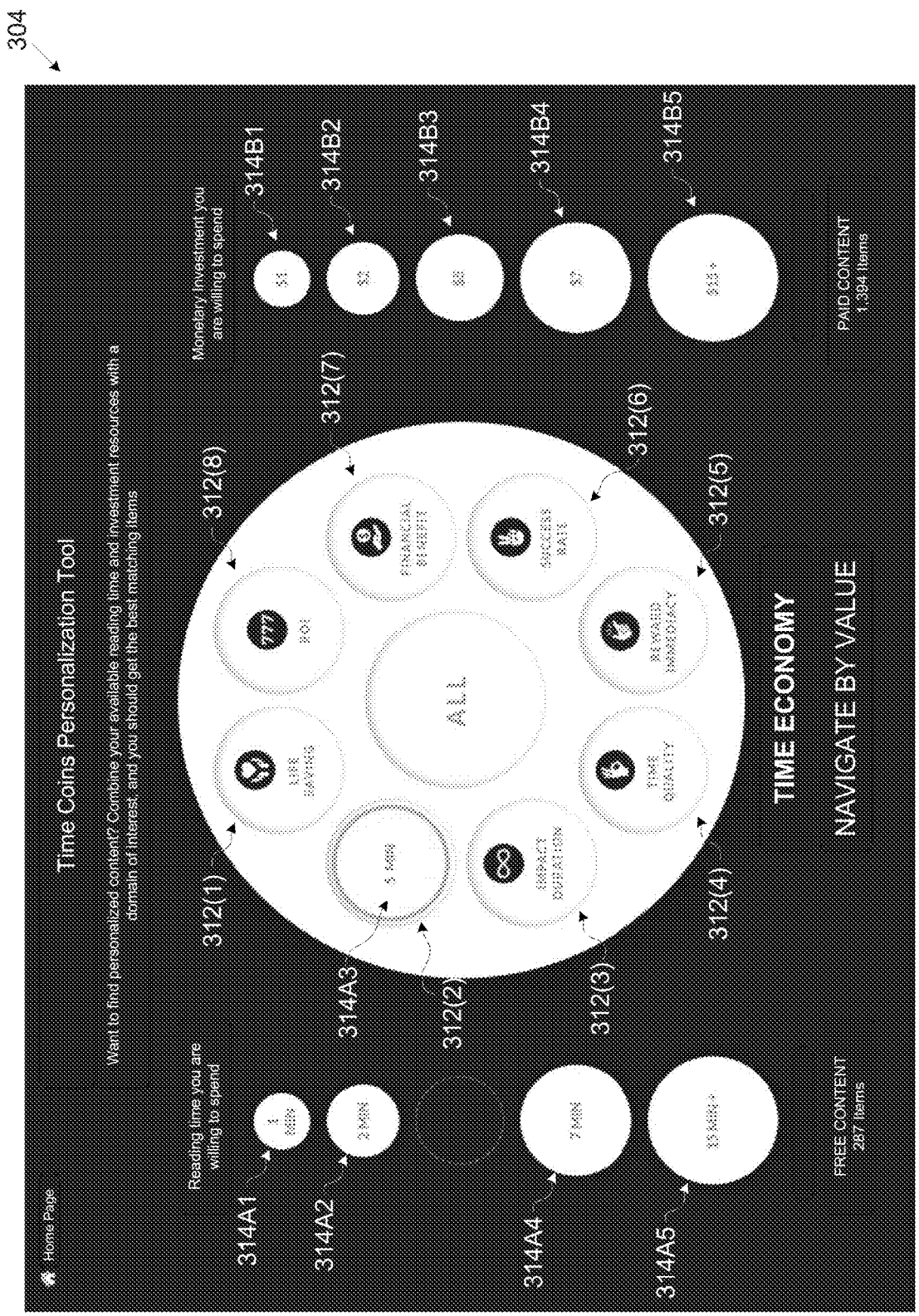
Figure 3D:
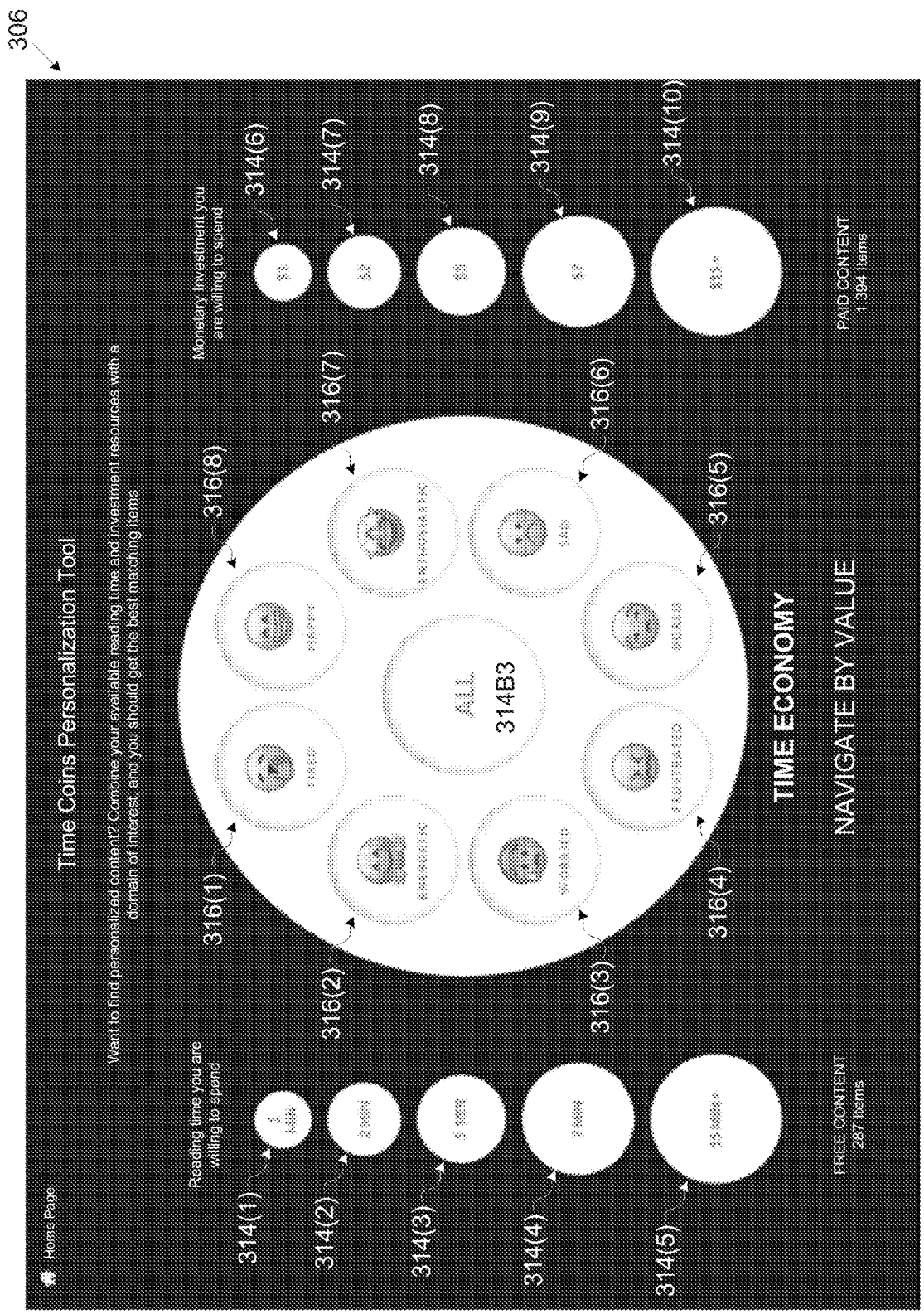

Reference is also made to FIG. 2, which is a schematic illustration of an exemplary system for searching and recommending users of consumable items published online based on their quantified value match with users' benefit selection, according to some embodiments of the present invention.

One or more client devices 200, for example, a server, a desktop computer, a laptop computer, a Smartphone, a tablet, a Virtual Reality (VR) device, an Augmented Reality (AR) device, a proprietary client device and/or the like may be used by one or more associated users 202 to search for consumable items published (offered) online by one or more online content resources (publishers) 204, for example, a webpage, a web application, an online service, an online marketplace, and/or the like.

Each client device 200 may comprise a network interface 210, a processor(s) 212, and a storage 214 for storing data and/or code (program store), and a user interface 216 for interacting with the associated user 202.

The network interface 210 may include one or more network modules each comprising hardware, software, and/ or firmware for connecting to a network 206 comprising one or more wired and/or wireless networks, for example, a Local Area Network (LAN), a Wireless LAN (WLAN, e.g. Wi-Fi), a Wide Area Network (WAN), a Metropolitan Area Network (MAN), a cellular network, the internet, StarLink, and/or the like. Via its network interface 210, the client device 200 may communicate, over the network 206, with one or more of the online content resources 204.

The processor(s) 212, homogenous or heterogeneous, may include one or more processing nodes and/or cores arranged for parallel processing, as clusters and/or as one or more multi core processor(s). The storage 214 may include one or more non-transitory persistent storage devices, for example, a Read Only Memory (ROM), a Flash array, a Solid State Drive (SSD), a hard drive (HDD) and/or the like. The storage 214 may also include one or more volatile devices, for example, a Random Access Memory (RAM) component, a cache and/or the like.

The processor(s) 212 may execute one or more software and/or firmware modules such as, for example, a process, a script, an application, an agent, a utility, a tool, a device driver, an Operating System (OS), a service, a plug-in, an add-on, and/or the like each comprising a plurality of program instructions stored in a non-transitory medium (program store) such as the storage 214 and executed by one or more processors such as the processor(s) 212.

Optionally, the processor(s) 212 includes, utilizes and/or applies one or more hardware elements integrated in the client device 200 to support one or more of the software modules executed by the client device 200, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU) and/or the like.

The processor(s) 212 may therefore execute one or more functional modules utilized by one or more software modules, one or more of the hardware elements and/or a combination thereof. For example, the processor(s) 212 may execute a search engine 220, specifically a local search engine 220A configured to execute the process 100 and/or part thereof for searching and recommending online published consumable items which relate to domain(s) indicated by the users 202 and match with high probability benefits defined by the users.

The user interface 216 may include one or more Human-Machine Interfaces (HMI) for interacting with the user 202, for example, a keyboard, a pointing device (e.g., a mouse, a touchpad, a trackball, etc.), a screen, a touchscreen, a digital pen, a speaker, an earphone, a microphone and/or the like. The user may therefore operate one or more of the HMI interface of the user interface 216 to interact with his associated client device 200, for example, with the search engine 220 in order to, for example, select domain(s) of interest, define benefit parameters and/or goals, and/or the like.

Optionally, the search engine 220 may be executed by one or more remote servers, systems, services, platforms, and/or the like, collectively designated search server 208. In particular, such a remotely executed search engine is designated remote search engine 220B. In such deployments, the client devices 200 may execute a local agent, for example, a web browser (e.g., Chrome, Safari, Firefox, Edge, Opera, etc.), a mobile application, and/or the like configured to communicate, via the network 206, with the remote search engine 220B executed by the remote server 208.

The local search engine 220A executed by the client devices 200 may thus serve as intermediators in such embodiment, which may intermediate and relay data between their associated users 202 and the remote search engine 220B.

The search server 208 may comprise computing resources, for example, a processor(s) such as the processor(s) 212, a storage such as the storage 214, and/or the like which may be used to execute the remote search engine 220B. The search server 208 may further comprise a network interface such as the network interface 210 for connecting to the network 206 in order to browse the online content resources 204 and for communicating with the client devices 200.

Optionally, the search server 208 and/or the remote search engine 220B may be utilized and/or implemented by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud, Microsoft Azure, Amazon Web Service (AWS) and Elastic Compute Cloud (EC2), IBM Cloud, and/or the like.

Depending on the deployment, architecture and/or implementation of the search engine 220, i.e., the local search engine 220A locally deployed in one or more of the client devices 200 and/or the remote search engine 220B remotely executed by the search server 208, the process 100 may be executed by the local search engine 220A, by the remote search engine 220B and/or jointly by the two search engines 220A and 220B. However, for brevity, regardless of the exact deployment, architecture and/or implementation, the search engine 220 is described herein after to execute and control the entire process 100.

Moreover, the steps of the process 100 executed by the client device 200 and/or of the search server 208 may be executed by any of the one or more processors of their processor(s) 212 such that each of the processors of the processor(s) 212 may execute the entire process 100 and/or part thereof.

Moreover, while the process 100 is described for a single user 202 using a respective client device 200 to search for consumable items published the online, it should not be construed as limiting since the same process may be expanded and scaled for a plurality of users 202 using a plurality of client devices 200 to search for online published consumable items.

As shown at 102, the process 100 starts with the search engine 220 receiving one or more benefit parameters defined by the user 202 for consumable items relating to one or more domains of interest.

The domain of interest of the user 202 may encompass practically any life aspect that the users 202 may be interested in. For example, the domains of interest may include one or more investment and/or capital domains such as, for example, investment approaches, investment areas, capital funding, investment skills, current investment trends, and/or the like. In another example, the domains of interest may include one or more time categories, for example, time saving, expediting events and/or processes, improving time utilization, and/or the like. In another example, the domains of interest may include one or more health domains such as, for example, physical health, mental health, and/or the like. In another example, the domains of interest may include one or more career categories such as, for example, self-fulfillment, career opportunities, career improvement, education options, professional proficiency, and/or the like. In another example, the domains of interest may include one or more education aspects such as, for example, academic studies, academic institutions ranking, learning methods, education trends, and/or the like. In another example, the domains of interest may include one or more parenting categories such as, for example, child education, values imbuement, parenting skills, children's games, and/or the like. In another example, the domains of interest may include one or more self-improvement and/or life impact aspects, such as, for example, social skills, interpersonal skills, mental skills, physical skills, and/or the like. In another example, the domains of interest may include one or more shopping categories such as, for example, availability, prices, reviews, sales, and/or the like of one or more products and/or services. In another example, the domains of interest may include one or more leisure fields such as, for example, travel, dining, entertainment, media consumption (e.g., music, movies, shows, etc.), hobbies, and/or the like. In another example, the domains of interest may include one or more daily life aspects such as, for example, politics, traffic, weather, news, and/or the like.

The consumable items may comprise items which may be consumed by the users 202, for example, used, read, viewed, heard, bought, subscribed, eaten, drank, and/or the like and may include, for example, text items, visual items, audio items, products, services, and/or the like. Text items may include, for example, articles, books, reviews, critics, news, and/or the like. Visual items may include, for example, pictures, photographs, video clips, movies, video broadcasts, recorded events, and/or the like. Audio items may include, for example, audio clips, music, audio lectures, audio books, podcasts, audio broadcasts, recorded events, and/or the like. Products may include, for example, computing devices, telecommunication devices, home appliances, gadgets, accessories, tools, apparel, jewelry, furniture, vehicles, real-estate assets, financial assets (e.g., stocks, bonds, derivatives contracts, etc.), travel packages (e.g., flights, hotels, etc.), entertainment (e.g., cinema, sport events, music concerts, etc.), and/or the like. Services may include, for example, medical services, financial services (e.g., banking, credit card, etc.), multimedia services (e.g. media streaming, etc.), content services, telecommunication services, shopping services, maintenance services, daily services (e.g., cleaning, laundry, home repair, auto repair, etc.), and/or the like.

However, the consumable items may further comprise higher level items which may relate to one or more experiences, activities, living conditions and/or the like, for example, travel destinations, sport activities, social activities, mating (partner) opportunities, job opportunities, residence destinations, neural stimulations, and/or the like.

Each consumable item may typically relate to one or more of the domains of interest. For example, a certain online content, for example, a text article, a video clip, an audio podcast, and/or the like addressing a certain capital investment avenue may relate to the investment and capital domains, the career categories, and/or to the leisure domains. In another example, a certain music subscription channel may relate to the leisure domains, the shopping categories, and/or the parenting categories.

The benefit parameters may define and/or express one or more benefits, typically in value terms, which the user 202 seeks, pursues, and/or desires with respect to the domain(s) of interest he selected. The benefit parameters may be expressed in one or more terms, typically numerical terms, for example, time, money (monetary value), life improvement and/or risk. The time benefit parameters may define, for example, save time, amount of saved time, improve quality of spent time, reduce wait time, increase free time, and/or the like. The money benefit parameters may define, for example, save money, spend money, amount of saved saved/spent money, Return On Investment (ROI), and/or the like. The life improvement benefit parameters may define, for example, increase life quality, increase life expectancy, reduce hazards risk, increase sense of self-fulfillment, improve personal, interpersonal, and/or social skills, and/or the like.

The benefit parameters may be further expressed in one or more categories, classes, and/or the like. For example, one or more of the benefit parameters may define a mood of the user 202, for example, happy, tired, sad, energetic, worried, frustrated, and/or the like. In another example, one or more of the benefit parameters may define a goal of the search, for example, education, research, work, fun, gaming, and/or the like.

The user 202 may select the domain(s) of interest and define the benefit parameters by interacting with the search engine 220 using one or more of the HMI interfaces provided and supported by the user interface 216 of the client device 200. For example, the search engine 220 may instruct, operate, drive and/or generate a Graphic User Interface (GUI) on the screen of the client device 200 which may comprise visual elements, items, symbols, and/or the like representing domains of interest and define benefit parameters such that the user 202 may check, click, point, drag, indicate, hover and/or otherwise select one or more of the visual elements, items, symbols, and/or the like to select domains of interest and define benefit parameters.

In another example, the search engine 220 may instruct, operate, drive and/or generate an audio output of the client device 200 to play audio options and/or instructions which the user 202 may execute in order to select domains of interest and define benefit parameters, for example, speak to a microphone of the client device 200, interact with a GUI displayed on a screen of the client device and/or the like.

According to some embodiments of the present invention, the GUI of the search engine 220 may be configured to support multi-selection of the benefit parameter(s) and the domain(s) of interest in a single user interface action. As such the user 202 may select both the domain(s) of interest and the benefit parameter(s) relating to the selected interest domain(s) in a single action and/or operation with the GUI. For example, the GUI may comprise one or more first visual elements, for example, a symbol, an icon, a shape, a text, and/or the like representing benefit parameters and one or more second visual elements representing domains of interest. The user 202 may therefore drag one or more of the first visual elements and drop them on (over) one or more of the second visual elements or vice versa, drag one or more of the second visual elements and drop them on one or more of the first visual elements. In another example, the GUI may comprise one or more third visual elements representing domains of interest. Each of the third visual elements may be associated with one or more fourth visual elements representing benefit parameters. The user 202 may therefore select one or more of the fourth elements which may automatically select both the selected fourth element(s) and their associated third element(s). The association may be done in the GUI, for example, by displaying the fourth element(s) within each of the third elements.

Reference is now made to FIG. 3A, FIG. 3B, FIG. 3C, and FIG. 3D, which are screenshots of an exemplary GUI of a value-based search and recommendation engine configured to search and recommend users of consumable items published online based on their quantified value match with users' defined benefits, according to some embodiments of the present invention.

Screenshots 300 (FIG. 3A), 302 (FIG. 3B), 304 (FIG. 3C), and 306 (FIG. 3D) depict screens of an exemplary GUI of a search engine such as the search engine 220 executed by a client device such as the client device 200 used by an associated user 202 to search for one or more consumable items published online by one or more online content resources such as the online content resource 204.

In particular, the exemplary GUI is configured to support multi-selection of the benefit parameter(s) and the domain(s) of interest in a single user interface action.

In this example, the GUI presented in screenshots 300, 302, 304, and 306 is adjusted by the search engine 220 for a certain search mode, specifically searches of reading, viewing and/or hearing online content, for example, text, images, videos, audio clips, podcasts and/or the like relating to a plurality of domains of interest, for example, life-saving, time-saving, impact duration, time quality, reward immediacy, success rate, financial benefit, and ROI.

The screenshot 300 of the exemplary GUI of the search engine 220 may be therefore configured to display (present) a plurality of first visual elements 312, for example, circles each representing a certain one of the domains of interest. For example, a first visual element 312(1) may represent life-saving, a first visual element 312(2) may represent time-saving, a first visual element 312(3) may represent impact duration, a first visual element 312(4) may represent time quality, a first visual element 312(5) may represent reward immediacy, a first visual element 312(6) may represent success rate, a first visual element 312(7) may represent financial benefit, and a first visual element 312(8) may represent ROI.

The search engine 220 may further adjust the GUI to present a plurality of second visual elements 304, for example, circles representing benefit parameters. Since the domains of interest defined by the GUI captured in screenshots 300, 302, 304 and 306 is directed to consumable online content (rather than products, services, etc.), the search engine 220 may adjust the GUI to present two distinct categories—free content and paid content.

For the free content, the second visual elements 314 may express time values of time of the user 202, for example, how much time the user 202 is willing to spend (invest) in consuming the online content (e.g., read, watch, listen, etc.), how much time does the user 202 wish to save by consuming the online content, and/or the like. For the paid content, the second visual elements 314 may express monetary (money) values of money earned and/or spent by the user 202, for example, how much money the user 202 is willing to spend (invest) in consuming the online content, how much money does the user 202 wish to save and/or earn by consuming the online content, and/or the like.

For example, a second visual element 314(1) may represent a time value of 1 minute (MIN), a second visual element 314(2) may represent a time value of 2 minutes, a second visual element 314(3) may represent a time value of 5 minutes, a second visual element 314(4) may represent a time value of 7 minutes, and a second visual element 314(5) may represent a time value of 15 minutes or more. In another example, a second visual element 314(6) may represent a money value of 1 dollar ($), a second visual element 314(7) may represent a money value of 2 dollars, a second visual element 314(8) may represent a money value of 5 dollars, a second visual element 314(9) may represent a money value of 7 dollars, and a second visual element 314(10) may represent a money value of 15 dollars or more. The time values may relate to the time required for the user 202 to consume (e.g., read, watch, listen, etc.) the online content and/or to the time required for the user 202 to apply the content relayed in the consumed online content. Similarly, the monetary values may relate to the money required for the user 202 to purchase (e.g., buy, subscribe, etc.) the online content and/or to the money that the user 202 is required to invest in order to apply the content relayed in the consumed online content.

Screenshot 302 shows exemplary info box 310(1) and 310(2) each comprising instructions directed to assist the user 202 to apply a single action (interaction) with the GUI to make a multi-selection. Specifically, the info box 310(1) and 310(2) may instruct the users to make the multi-selection by defining one or more benefit parameters, represented by the second visual elements 314, for one or more of the interest domains, represented by the first visual elements 312, by dragging and dropping the respective second visual element(s) 314 on the respective first visual element(s) 312.

Screenshot 304 demonstrates an exemplary selection of the users 202 made by dragging the second visual element 314(3), representing the 5 minutes' content consumption time benefit parameter, and dropping it on (over) by the first visual elements 312(2), representing the time-saving interest domain.

The screenshot 306 of the exemplary GUI of the search engine 220 may be configured to display a plurality of moods selectable by the user 202 to define one or more of the benefit parameters to indicate a (current) mood of the user 202. As seen in the screenshot 306, the GUI of the search engine 220 may comprise a plurality of first visual elements 316, for example, circles each representing a certain mood. For example, a first visual element 316(1) may represent a tired mood, a first visual element 312(2) may represent an energetic mood, a first visual element 312(3) may represent a worried mood, a first visual element 312(4) may represent a frustrated mood, a first visual element 312(5) may represent a bored mood, a first visual element 312(6) may represent a sad mood, a first visual element 312(7) may represent an enthusiastic mood, and a first visual element 312(8) may represent a happy mood.

The user 202 may therefore define the benefit parameters to define his mood by selecting one or more of first visual elements 316. For example, the user 202 may drag one or more of the second visual elements 314 representing time values and drop them on one or more of the first visual elements 316 repressing his (selected) mood.

As shown at 104, the search engine 220 may browse one or more of the plurality of online content resources 204 to search for a plurality of consumable items published by the online content resources 204. Specifically, the search engine 220 may search for consumable items which relate to the domain(s) of interest selected by the user 202 and evaluated according to the benefit parameter(s) defined by the user 202.

Since the number of online content resources 204 may be extremely high and their capacity may be huge, browsing the online content resources 204 may be resource and/or time intensive. The search engine 220 may apply one or more methods to effectively browse the online content resources 204 in search of consumable items while reducing search time and/or computing resources utilization, for example, computing resources, memory resources, network resources, and/or the like.

For example, the search engine 220 may use one or more other search engines, for example, Google search, Bing, Yandex, CC search, and/or the like. Moreover, when using the existing search engine(s), the search engine 220 may adjust the query according to the interest domain(s) and benefit parameter(s) defined by the user 220. In another example, the search engine may access one or more content index records, for example, a file, a list, a database, and/or the like which may list online content resources 204 which publish consumable items. Optionally, the search engine 220 may update the content index record(s) according to information collected during one or more searches.

As shown at 106, the search engine 220 may analyze a benefit label associated with one or more of the plurality of consumable items published (offered) by the online content resource(s) 204.

The benefit label associated with each consumable item may be indicative of one or more quantified benefit values which may be expressed in one or more metrics, typically numeric metrics, for example, time value, money (monetary) value, life improvement and/or risk value, and/or the like. Moreover, the quantified benefit values may indicate, express and/or reflect one or more measures and/or terms of the time value, monetary value, life improvement/risk value expressing, for example, an amount, a probability, a risk, an impact expectancy, an impact immediacy, an impact duration, an impact scale and/or the like.

The time value associated with one or more of the consumable items may express a quantified value of one or more time benefits estimated for the user 202 as result of consuming the respective consumable item. The time value may be typically expressed in numeric value, for example, minutes, hours, days, weeks, months, years, and/or the like. The time benefits may comprise, for example, time save, time gain, improvement of time utilization, ROI in terms of time to ROI, and/or the like. As such, the time value may express, for example, a duration (amount) of saved and/or gained time, an expected immediacy of the ROI, a probability of saving and/or gaining time, longevity, and/or the like.

For example, reading and applying the content of a certain online text article (consumable item) which requires approximately 7 minutes read time may be estimated to save an average person about 30 minutes a week. The certain online text article may be therefore associated with a benefit label indicative of a time value of 30 minutes save per week. In another example, watching and applying the content presented in a certain minutes' online physical exercise video show (consumable item) broadcasted every week may be estimated to increase the lifetime of an average person by about 3 years. The online physical exercise video show may be therefore associated with a benefit label indicating of a time value of a 3 years gain. The benefit label of the online physical exercise video show may further indicate an ROI time value computed by deducting the weekly 60 minutes spent for watching the online physical exercise video show from the gained life time.

The monetary value associated with one or more of the consumable items may express a quantified value of one or more monetary benefits estimated for the user 202 as result of consuming the respective consumable item. The monetary value may be typically expressed in numeric value, for example, fiat money units, cryptocurrency units, and/or the like. The monetary benefits may comprise, for example, saved monetary (money) value, earned monetary (money) value, improved liquidity, reduced risk, an ROI on investment, and/or the like. As such, the monetary value may express, for example, an amount of saved and/or earned money, a probability and/or risk of earning, losing and/or saving money, an expected immediacy of the ROI (e.g., week, month, year, etc.), a probability of earning, losing and/or saving money, and/or the like.

For example, reading and applying the content of a certain financial guide book (consumable item) which costs $14 may be estimated to save an average person about a $100 a year. The certain financial guide book may be therefore associated with a benefit label indicating of a monetary value of a $100 annual earning. In another example, a certain consumable item, for example, a certain home appliance estimated to be fully operational for 10 years may cost $500 and consume a $40 worth of electricity every year. The certain home appliance may be therefore associated with a benefit label indicative of a money value of $900.

The life improvement value associated with one or more of the consumable items may express a quantified value of one or more life improvements and/or risks in one or more life aspects estimated for the user 202 as result of consuming the respective consumable item. The life improvement value may be expressed in numeric value which may be continuous and/or discrete, for example, a range, a scale, a binary value ("0" or "1"), and/or the like. The life aspects may comprise, for example, physical health, mental health, self-fulfillment, career, education, social skills, mental skills, physical skills, overall life impact and/or the like. As such, the life improvement/risk value may express, for example, a probability of the estimated improvement and/or risk, an impact expectancy of the estimated improvement/risk, an impact immediacy of the estimated improvement/risk, an impact duration of the estimated improvement/risk, an impact scale of the estimated improvement/risk and/or the like.

For example, consuming a certain vitamin (consumable item) may be estimated to reduce probability of heart attacks for men by 50%. The certain vitamin may be therefore associated with a benefit label indicating of men physical health life improvement of 50%. In another example, listening and applying the content of a certain daily online self-enhancement podcast may be estimated to significantly improve couples' interrelation for 25% of married women with their spouse. The online self-enhancement podcast may be therefore associated with a benefit label indicating of women marriage life improvement of 25%. In another example, drinking a certain alcoholic beverage (consumable item) may be estimated to reduce mental skills by 15%. The certain alcoholic beverage may be therefore associated with a benefit label indicating of potential life risk of 15% harm and/or reduction in mental skills. In another example, one or more consumable items may be associated with benefit labels indicative of binary value, for example, one or more consumable items estimated to improve a certain life aspect may be associated benefit labels indicating "1" while one or more consumable items estimated not to improve and/or have no impact on the certain life aspect may be associated benefit labels indicating "0". In another example, one or more consumable items may be associated with benefit labels indicative of a called value, for example, a number in a range of 1-10 reflecting a level of impact estimated for the respective consumable item on the user 202. For example, a value of "0" may indicate that the respective consumable is estimated to have no improvement impact for the user 202 while a value of "10" may indicate that the respective consumable is estimated to have major improvement impact for the user 202.

While some of the consumable items may be labeled with benefit labels indicative of a single quantified benefit value, the benefit label of most consumable items may be indicative of multiple quantified benefits, i.e., time value, monetary value and/or life improving/risk typically interrelated and/or dependent on each other.

For example, investing a 1,000 hours of reading time in a certain stock exchange investment book costing $14 may be estimated to yield a total of $400,000. This may be translated to $400 per reading hour. The capital investment reading material may be therefore associated with a benefit label indicating of a time value of 1,000 and a monetary value of $400 per hour and/or an overall of $400,000.

In another example, following a first route (consumable item) suggested by a navigation application which is longer than a second route may be estimated to save 45 minutes' drive by going through a toll road costing $9. The first route may be therefore associated with a benefit label indicating of a time value of 45 minutes and a monetary value of $9. Moreover, the monetary value indicated by the benefit label may further aggregate and/or express average costs of fuel and/or vehicle tear estimated for travelling the extra distance of the longer second route.

In another example, a certain travel destination costing $600 may be estimated to be highly relaxing for 70% of the people. The certain travel destination may be therefore associated with a benefit label indicating of a monetary value of $600 and relaxation (self-fulfillment) life improvement of 70%.

In another example, living in a certain residence destination and/or location, for example, Australia may be estimated to provide an annual income of $120,000 and increase life expectancy by 5 years. Australia as a residence destination may be therefore associated with a benefit label indicating of a monetary value of $120,000 and physical health increase of 5 years.

It should be noted that for the time value, monetary value, effect and/or impact of the consumable items are estimated for the user 202 under the assumption that the user 202 fully consumes the respective consumable item. Consumption of some of the consumable items may be defined as simply consuming the respective consumable item, i.e., using it, applying it, reading it, viewing it, listening to it, and/or the like. For such consumable items the value, effect and/or impact estimated for the user 202 may be relatively simple. However, other consumable items may not be simply consumed, but may require the user 202 to further apply at least the essence of these consumable items in order to realize their value, effect and/or impact. For example, assuming the consumable item is a text article teaching a method for increasing stock exchange revenues. In such case, the monetary value estimated for the user 202 who reads the article is based on the assumption that the user 202 fully applies the method described in the article. In another example, assuming the consumable item is six-months twice a week subscription to a gym, the improvement and/or risk estimated for the user 202 is based on the assumption that the user 202 actually attends to the gym twice a week for six months.

The benefit labels associated with the one or more of the consumable items may be generated, created, and/or computed automatically based on content relating to the respective consumable items, for example, textual content, visual content, audible content, and/or the like.

The textual content, visual content, audible content, and/ or the like may be first converted to one or more forms and/or formats, for example, text. For example, one or more text extraction tools may be applied to extract the textual content relating to one or more of the consumable items, for example, the content of an online text item, a product description of a product, a presentation of a service, and/or the like. In another example, one or more image processing algorithms may be applied to analyze and extract the visual content relating to one or more of the consumable items, for example, an image, a video clip, a presentation, and/or the like. In another example, one or more signal processing algorithms may be applied to analyze and extract the audible content relating to one or more of the consumable items, for example, an audio presentation, a commercial, a podcast, and/or the like.

One or more Natural Language Processing (NLP) algorithms as known in the art may be then applied to analyze the extracted content relating to one or more of the consumable items in order to extract, identify and/or infer one or more quantified benefit values for the respective consumable item expressed in terms of time value, monetary value, life improvement and/or risk, and/or the like.

Optionally, automatically generating benefit labels for one or more of the consumable items may be done using one or more Machine Learning (ML) models, for example, a neural network, a classifier, a Support Vector Machine (SVM), and/or the like trained to compute the quantified benefit value(s) for the respective consumable item. In particular, the ML model(s) may be trained to compute the quantified benefit value(s) of the respective consumable items based on content analysis and/or context analysis.

The ML model(s) may be trained in one or more supervised, unsupervised, and/or semi-supervised learning sessions using a plurality of training samples comprising a plurality of consumable items, wherein optionally at least some of the training samples may be labeled with benefit labels.

For example, the ML model(s) may be trained to estimate average consumption time of online text items, online visual items and/or online audio items using a plurality of training samples relating to one or more online text items, online visual items and/or online audio items selected and configured accordingly, for example, labeled with consumption time.

In another example, the ML model(s) may be trained to compute the quantified benefit values expressed in time value, monetary value and/or life improvement value based on content analysis using a plurality of training samples comprising content relating to one or more of consumable items. For example, one or more training samples may comprise a product description of one or more products which may detail one or more monetary values of the respective product, for example, purchase cost, rental cost, maintenance cost, service cost and/or the like. The ML model(s) trained with such training samples of which at least some may be optionally labeled accordingly (cost label) may learn to estimate, predict and/or infer the monetary value of one or more similar consumable items and/or related consumable items sharing one or more parameters, attributes, and/or characteristics with the described products. Similarly, the ML model(s) may be trained to learn time value and/or life improvement/risk value after trained with a plurality of training samples comprising information relating to one or more consumable items.

In another example, the ML model(s) may be trained to compute the quantified benefit values based on context analysis using a plurality of training samples comprising content relating to one or more of consumable items. For example, one or more training samples may comprise research results relating to impact (e.g., risk increase) of smoking on one or more life improvement/risk aspects, for example, physical health, life expectancy, mental state, and/or the like. The ML model(s) trained with such training samples may learn, adjust and evolve to estimate, predict and/or infer quantified life improvement/risk values for one or more similar and/or related, consumable items, for example, tobacco products, electronic cigarettes, and/or the like. Moreover, trained with the research results training samples, the ML model(s) may learn to estimate, for one or more similar and/or related consumable items, quantified benefit values expressed in terms of time value and/or monetary value, for example, estimated lost time as result of reduced life time, annual cost of treatment for smoking damages, and/or the like.

The ML model(s) may be further trained using one or more training samples generated based on user feedback relating to one or more consumable items, for example, reviews, ranking scores, poles, surveys and/or the like. For example, the training samples may associate one or more consumable items with time save values, monetary gain values, and/or life improvement scores provided by one or more users who previously consumed the consumable item (s). Trained with such training samples, the ML model(s) learn to estimate, predict and/or infer quantified benefit values of one or more similar and/or related consumable items which may be expressed in time value, monetary value and/or life improvement/risk value. In another example, the training samples may comprise textual reviews provided by one or more users with respect to one or more consumable items. The textual reviews may be analyzed as described herein before to extract one or more quantified benefit values for these consumable items which may be used as training samples for training the ML model(s). Trained with these training samples, the ML model(s) may therefore learn to estimate one or more quantified benefit values of one or more similar and/or related consumable items.

Optionally, the benefit labels of one or more consumable items may be generated manually. For example, one or more users 202 using, rating, ranking and/or evaluating one or more of the consumable items may assign one or more quantified benefits values, for example, a time value, a monetary value, a life improvement/risk value and/or the like to the respective consumable items typically based on their personal consumption experience and create their associated benefit labels accordingly. In another example, one or more experts, for example, critics, researchers, distributers, and/or the like may assign the quantified benefits values to one or more consumable items and create their associated benefit labels accordingly.

Optionally, the benefit labels of one or more consumable items may be adjusted according to user feedback provided by one or more users 202 who consumed the consumable items and rate, rank and/or state one or more of the quantified benefits values for the consumable items based on their personal consumption experience. For example, assuming that a certain consumable item is associated with a benefit label indicative of a certain time and/or monetary value. Further assuming a plurality of users 202 who consumed the certain consumable item assign a lower time save value and a higher monetary gain value to the certain consumable item. In such case, the benefit label of the certain consumable item may be adjusted, typically automatically, to reflect the lower time save value and/or the higher monetary gain value.

Optionally, the quantified benefit value(s) of one or more of the consumable items may be adjusted according to one or more user attributes relating to the user 202, for example, personal attributes, geolocation attributes, timing attributes, and/or the like. The personal attributes may comprise, for example, gender, age, physical attributes (e.g., height, weight, etc.), status (e.g., married, in relationship, single, children etc.), job occupation (profession), education level, income, type of the client device 200, vehicle model, a medical condition, and/or the like. The geolocation attributes may comprise, for example, residence location (e.g., address, area, city, state, etc.), work location, current location, and/or the like. The timing attributes may comprise, for example, time of day, date, season, and/or the like.

For example, continuing the navigation application suggesting a longer time saving first route (consumable item) which has an increased monetary value compared to a shorter second route (consumable item). In such case, one or more of the quantified benefit value indicated by the benefit label of the second route, for example, the monetary value (originally loss of $9) may be adjusted according to an occupation of the user 202. For example, the monetary value may be adjusted according to a specific vehicle of the user 202, for example, an expensive high fuel consuming luxury car, to indicate an increased loss reflecting the above average fuel consumption and higher vehicle wear of the luxury car. For example, assuming the fuel and tear are estimated at $20 for the luxury car of the users 202, the monetary value of the second route may be adjusted to reflect money loss of $29 ($20+$9). In another example, the monetary value expressing the quantified benefit value indicated by the benefit label of the second route may be adjusted according to an occupation of the user 202 to reflect a value of (average) money earned by the user 202 by working during the 45 minutes' time saved by going through the time saving second route. For example, assuming a work hour of the user 202 is priced at $100, estimated based on the income attribute of the user 202 and/or based on average income evaluated for the profession of the user 202, the monetary value of the second route may be adjusted to reflect money earning of $66 (0.75×100−9).

Moreover, the benefit label of the first and second routes (consumable item) may be adjusted or not according to one or more timing and/or geolocation attributes relating to the user 202. For example, in case the time of the ride is in a weekday morning when the user 202 is estimated to go to work and the second route is the route to a work place of the user 202, the benefit label associated with the second route may be adjusted to reflect the earned money during the saved time as described herein before. However, in case based on the time and route, the user 202 is not estimated to go to work, the benefit label associated with the second route may not be adjusted since the user 202 may not earn any additional money during the saved time.

As shown at 108, the search engine 220 may select one or more of the consumable items for recommending them to the user 202.

In particular, the search engine 220 may select the one or more consumable items based on a correspondence (match) between one or more of their quantified benefit values and the benefit parameter(s) defined by the user 202. As such, the search engine 220 may select one or more of the consumable items associated with benefit labels indicting of one or more quantified benefit values which are estimated with high probability to correspond (match) the benefit parameter(s) defined by the user 202.

For example, assuming one of the benefit parameters defined by the user 202 specifies a spend time of 7 minutes, the search engine 220 may select one or more consumable items, for example, online contact, typically free content such as, for example, an online text item, an online visual item, an online audio item and/or the like which require approximately 7 minutes to consume for an average user and are thus associated with benefit labels indicating a time value of 7 minutes spend time.

In another example, assuming one of the benefit parameters defined by the user 202 specifies a spend money value of $2 minutes, the search engine 220 may select one or more paid consumable items, for example, an online text item, an online visual item, an online audio item and/or the like which cost $2 and are thus associated with benefit labels indicating a monetary value of $2 cost.

In another example, assuming one of the benefit parameters defined by the user 202 specifies an annual gain/save of $4000, the search engine 220 may select one or more consumable items, for example, an investment guide book, an online housekeeping cost saving blog, and/or the like having content that if applied may yield an income and/or saving of $4,000 per year and are thus associated with benefit labels indicating a monetary value of $4,000 per year.

In another example, assuming one of the benefit parameters defined by the user 202 specifies an increase life time of 5 years, the search engine 220 may select one or more consumable items, for example, a physical exercise weekly online program, a gym subscription, a diet book, a vitamin, and/or the like which are expected to extend the life expectancy of an average user 202 by 5 years and are thus associated with benefit labels indicating a time value of 5 years.

In another example, assuming one of the benefit parameters defined by the user 202 specifies improvement to self-fulfillment, the search engine 220 may select one or more consumable items, for example, a hobbies recommendation article, a yoga class subscription, and/or the like which are estimated to significantly increase the sense of self-fulfillment for an average user 202 and are thus associated with benefit labels indicating an improved self-fulfillment.

Optionally, the search engine 220 may adjust the selection of the selected consumable item(s) according to one or more of the user attributes relating to the user 202 which in addition to personal attributes, geolocation attributes, and timing attributes may further comprise one or more user settings, for example, a preferred type of consumable items, a preferred time value, a preferred monetary value and/or the like. The user settings which may be defined, logged and/or stored in one or more accounts, profiles, and/or records associated with the user 202 and accessible to the search engine 220 may be set by the user 202 himself and/or by one or more applications, services and/or utilities used by the user 202.

For example, assuming the benefit parameters provided by the user 202 define improving quality of leisure time, the search engine 220 select one or more consumable items relating to adopting new hobbies. However, in case the user 202 is a man, the search engine 220 may select one or more hobbies commonly considered as male hobbies while in case the user 202 is a woman, the search engine 220 may select one or more hobbies commonly considered as female hobbies.

In another example, search engine 220 may adjust the selection according to age of the user 202 and may select content and consumable item(s) which are relevant, beneficial, appropriate and/or suitable for the age of the user 202. For example, assuming the benefit parameters provided by the user 202 define saving money. In such case, assuming the user 202 is an adult married family man having 3 children, the search engine 220 may select one or more consumable items, for example, online text item, book, online lecture, and/or the like which address money saving for families by improving daily expenses management. However, in case the user 202 is a young person who goes to college, the search engine 220 may select one or more consumable items which address money saving for young students by selecting favorable and/or cost-effective student loans.

In another example, the search engine 220 may adjust the selection of the consumable item(s) according to a current location of the user 202. For example, assuming the benefit parameters provided by the user 202 define earning money, the search engine 220 may select one or more consumable items, for example, online text item, book, online lecture, and/or the like relating to job opportunities. The search engine 220 may further adjust the selection of the job opportunities related consumable items according to the residence location of the user 202 such that the job opportunities are directed to jobs at locations near the residential are of the user 202.

In another example, the search engine 220 may adjust the selection of the consumable item(s) according to a current time of day. For example, assuming the benefit parameters provided by the user 202 define earning money, the search engine 220 may select one or more consumable items, for example, online text item, book, online lecture, and/or the like relating to capital investment. Moreover, in case the time of day is weekday morning when the user 202 is estimated to be on his way to work and limited in time, the search engine 220 may adjust the selection of the consumable items to include short reading time content. However, in case the time of day is night when the user 202 is estimated to be at home and has free time, the search engine 220 may adjust the selection of the consumable items to include longer reading time content.

In another example, assuming the user settings associated with the user 202 define that the user 202 prefers visual content over text content, the search engine 220 may adjust the selection to include one or more visual consumable items, for example, a video clip, a show, a video stream, a picture, and/or the like which are estimated to match the benefit parameters defined by the user 202 while discarding text items even if their quantified benefit value(s) match the benefit parameters.

Optionally, the search engine 220 may adjust the selection of the selected consumable item(s) according to one or more consumption pattern of the user 202.

The consumption pattern(s) of the user 202 may be identified based on analysis of one or more previous recommendations of consumable items to the at least one user and optionally based his response and/or feedback to the recommendations, for example, did the user 202 consume the recommended consumable item or not, did he apply the content of the recommended consumable item or not, feedback (e.g., rating, ranking, etc.) provided by the user 202 for previously recommended consumable items, and/or the like.

For example, assuming the benefit parameters provided by the user 202 define earning money. Further assuming that based on analysis of previous recommendations of consumable items to the user 202, specifically recommendations of consumable items relating to earning money, it is determined that the user 202 is interested in earning money through real-estate investment. In such case, the search engine 220 may select one or more consumable items, for example, online text item, book, online lecture, and/or the like relating to real-estate opportunities. Moreover, the search engine 220 may further adjust the selection to select consumable items relating to real-estate opportunities in an area of the working place of the user 202.

Optionally, the search engine 220 may adjust the selection of the selected consumable item(s) according to selection of consumable items recommended to one or more other users 202 sharing one or more of the user attribute with the user 202 and optionally further based on their response and/or feedback to the recommended consumable items.

For example, assuming that the benefit parameters provided by the user 202 define improving physical health and leisure time. Further assuming the search engine 220 identifies that a certain consumable item, for example, a gym subscription was selected and recommended to one or more other users 202 sharing users attributes with the users 202, for example, gender, age, residence area, education level, and/or the like in response to similar benefit parameters defined by the other user(s) 202. In such case, the search engine 220 may select and/or adjust the selection of the consumable items recommended to the user 202 to include the gym subscription.

In particular, the search engine 220 may adjust the selection of the consumable item(s) selected for recommendation to the user 202 according to one or more consumption patterns of one or more other users 202 sharing one or more of the user attribute with the user 202. For example, assuming that based on analysis of a plurality of search and recommendation session conducted for a plurality of users, a certain search pattern is identified. The certain search pattern may outline that in response to a social skill improvement benefit parameter defined by a plurality of users 202 sharing one or more similar user attributes, for example, age, gender, status, job occupation, work location, and/or the like, for example, single men at ages 30-40 working in software development in a certain area, one or more certain consumable items, for example, a certain online text item addressing effective ways to meet women was highly consumed and rated accordingly by the users 202. In such case, the search engine 220 may adjust the selection of the consumable item(s) selected for the user 202 to include the certain online text item.

As shown at 110, the search engine 220 may instruct the client device 200 used by the user 202 to present user 202 one or more of the consumable items selected for recommendation to the user 202 such that the user 202 may use the presented consumable items.

The search engine 220 may instruct the client device 200 to present the selected consumable item(s) using one or more of the HMI interfaces supported by the user interface 216 of the client device 200, for example, visual display via a screen of the client device 200, audio stream (playback) via a speaker of and/or coupled to the client device 200, and/or the like.

Optionally, the search engine 220 may further rank the selected consumable items according to their match probability. For example, the search engine 220 may compute a ranking score according to a match probability estimated for each of the selected consumable items such that consumable items estimated with higher probability to match the benefit parameters defined by the user 202 may be assigned a higher ranking score, while consumable items estimated with lower probability to match the benefit parameters defined by the user 202 may be assigned a lower ranking score.

The search engine 220 may further instruct the client device 200 to present the selected consumable items in order according to their ranking score. For example, assuming the selected consumable items are displayed on a screen of the client device 200, the search engine 220 may instruct the client device 200 to list the selected consumable items in a top to bottom order according to their ranking score such that higher ranking (score) consumable items are listed higher in the list while lower ranking consumable items are listed lower in the list. In another example, assuming the selected consumable items are played via one or more speakers of the client device 200, the search engine 220 may instruct the client device 200 to announce the selected consumable items in a first to last order according to their ranking score such that higher ranking (score) consumable items are announced first followed by lower ranking consumable items.

In response to the presentation of the selected consumable item(s) at his associated client device 200, the user 202 may select one or more of the presented consumable item(s) for use and/or consumption, for example, read, view, listen, use, buy, subscribe and/or the like.

For example, the search engine 220 may instruct the client device 200 to adjust a GUI displayed on a screen of the client device 200 to present the selected consumable item(s) to the user 202.

Figure 4:
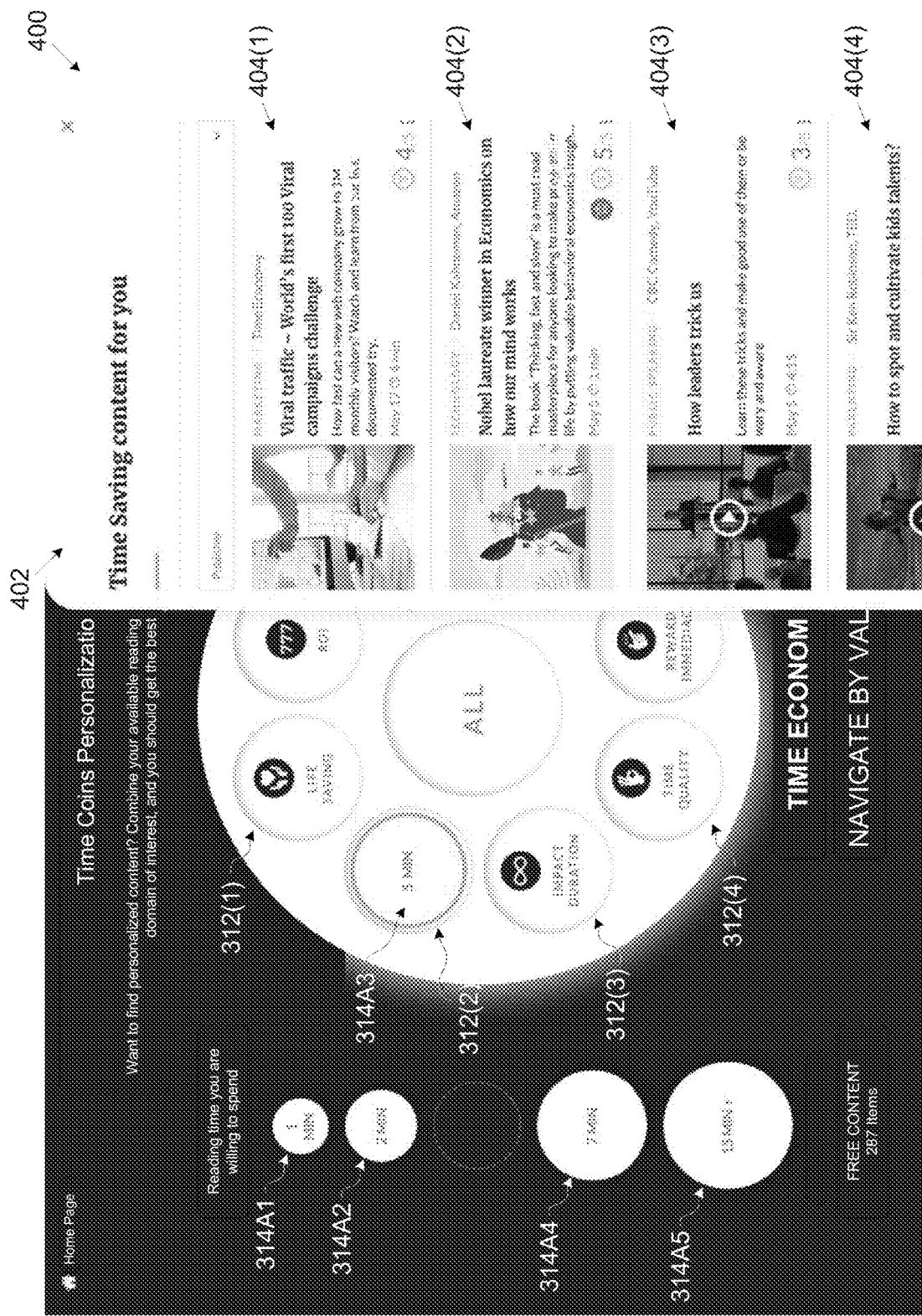
FIG. 4 is a screenshot of an exemplary GUI of a value-based search and recommendation engine displaying recommended consumable items estimated to best match user defined benefits, according to some embodiments of the present invention.

Reference is now made to FIG. 4, which is a screenshot of an exemplary GUI of a value-based search and recommendation engine displaying recommended consumable items estimated to best match user defined benefits, according to some embodiments of the present invention.

Screenshot 400 depicts an exemplary results screen of an exemplary GUI of a search engine such as the search engine 220 executed by a client device such as the client device 200 used by an associated user 202 to search for one or more consumable items published online by one or more online content resources such as the online content resource 204.

As seen, in response to an exemplary search defined by benefit parameters provided by the user 202, for example, 5 minutes read time of content relating to the domain of time saving, the search engine 220 may select a plurality of consumable items, for example, online content items 404 each comprising text, video, audio, and/or combination thereof, for recommendation to the user 202. The search engine 220 may further adjust the GUI to present a result list 402 comprising at least some of the selected online content items, for example, a text item 404(1), a text item 404(2), a video item 404(3) and a video item 404(4).

In response, the user 202 may select, for example, click, hover, and/or the like one or more of the online content items 404 presented by the GUI in order to consume them, for example, read, watch, listen, use, apply, buy, subscribe, save, share, rank, and/or the like.

Optionally, the search engine 220 may instruct transmission of one or more notifications to the user 202, specifically to one or more client devices such as the client device 200 associated with the user 202.

The notifications may be transmitted via one or more communication channels supported by the client device(s) 200 and/or available to the user, for example, a text message, an email, a mobile application notification, and/or the like.

Each such notification may be indicative of one or more consumable items selected for recommendation to the user 202 based on a correspondence (match) between their quantified benefit value(s) and one or more benefit parameters determined for the user 202 based on one or more previous search sessions conducted by the user 202.

For example, assuming that during a recent search session conducted with the user 202, the user 202 defined one or more benefit parameters relating to a certain domain. Following the session, the search engine 220 may continue browsing one or more of the online content servers 204 even if not currently engaged in a search session with the user 202. Further assuming that the search engine 220 determines that one or more consumable items correspond (match) with high probability to the benefit parameter(s) defined buy the user 202 in the recent session, in particular consumable item(s) not previously presented and recommended to the user 202. In such case the search engine 220 may initiate transmission of one or more notifications to notify and inform the user 202 of the newly found consumable item(s).

Optionally, the search engine 220 may share a description of one or more of the consumable items selected and recommended to user 202 with one or more other users. In particular, the search engine 220 may share consumable item(s) with the other user(s) based on share settings which may be defined by the user 202 and/or by the other user(s).

The share settings may be defined in one or more user specific records, for example, a profile, an account, a customizable user zone provided by the search engine 220 and/or the like.

For example, the user 202 may define in his share settings that one, some and/or all of the consumable items selected and recommended to him should be shared with another user, for example, his spouse. In such case, the search engine 220 may transmit to the spouse of the user 202 the description of the consumable item(s) selected and recommended to the user 202. Moreover, the user 202 may define sharing with his spouse only consumable item(s) selected and recommended by the search engine 220 which correspond (match) a certain benefit parameters defined by the user 202, for example, time gain.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms search engine, machine learning models, and user interface HMI are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of increasing performance of computerized web search by searching and recommending online consumable items based on quantified benefit value instead of or in addition to linguistic based search, comprising:

using a search engine executed by at least one processor and a Graphical User Interface (GUI), the at least one processor is configured for:

displaying on said GUI a first plurality of visual elements, each reflecting a different quantified benefit value associated with at least one of a plurality of domains of interest;

displaying on said GUI a second plurality of visual elements, each representing one of the plurality of domains of interest;

identifying a combination of at least one benefit parameter and at least one of the plurality of domains of interest by detecting a selection of the at least one benefit parameter selected by at least one user with respect to at least one of the plurality of domains of interest and detecting a drag and drop operation conducted by said at least one user on said GUI, dragging at least one first visual element of the first plurality of visual elements and dropping it over at least one second visual element of the second plurality of visual elements or vice versa, dragging the at least one second visual element and dropping it over the at least one first visual element;

obtaining from said drag and drop operation said combination of the selected at least one benefit parameter represented by said at least one first visual element and the selected at least one of the plurality of domains of interest represented by said at least one second visual element;

conducting a search for a plurality of consumable items relating to the selected at least one of the plurality of domains of interest represented by said at least one second visual element by browsing a plurality of online resources using a value-based search based on quantified benefit values, wherein basing said search on said quantified benefit values increases an accuracy of said search engine and reduces computing resources used by said search engine;

analyzing a benefit label associated with each of the plurality of consumable items and the benefit label generated automatically based on analysis of content relating to plurality of consumable items using at least one machine learning model (ML) trained to compute the at least one quantified benefit value for the at least one consumable item based on content analysis and/or context analysis, the benefit label of each consumable item expresses linguistic content and/or context of the respective consumable item in at least one quantified benefit value expressed in at least one metric which is a member of a group consisting of: time value, monetary value, and life improvement value;

selecting at least one of the plurality of consumable items based on a correspondence between the at least one quantified benefit value of the at least one consumable item and the selected at least one benefit parameter represented by said at least one first visual element; and instructing at least one client device used by the at least one user to present on said GUI the selected at least one consumable item for consumption by the at least one user.

2. The method of claim 1, further comprising computing a ranking score for each of the selected at least one consumable item and instructing the at least one client device to present the selected at least one consumable item in an order according to its ranking score.

3. The method of claim 1, wherein the content relating to the at least one consumable item is a member of a group consisting of: textual content, visual content and audible content.

4. The method of claim 1, further comprising training the at least one ML model using training samples generated based on user feedback.

5. The method of claim 1, wherein the benefit label of at least one of the plurality of consumable items is adjusted according to user feedback received from at least one user presented with the at least one consumable item.

6. The method of claim 1, wherein the at least one quantified benefit value expresses at least one of: an amount, a probability, a risk, an impact expectancy, an impact immediacy, an impact duration, and an impact scale.

7. The method of claim 1, wherein the time value expresses a quantified value of at least one time benefit estimated for the at least one user as result of consuming the respective consumable item, the at least one time benefit is a member of a group comprising: saved time, gained time, improvement of time utilization, and a return on investment.

8. The method of claim 1, wherein the monetary value expresses a quantified value of at least one monetary benefit estimated for the at least one user as result of consuming the respective consumable item, the at least one monetary benefit is a member of a group comprising: saved monetary value, earned monetary value, improved liquidity, reduced risk, and a return on investment.

9. The method of claim 1, wherein the life improvement value expresses a quantified value of improvement and/or risk in at least one life aspect estimated for the at least one user as result of consuming the respective consumable item, the at least one life aspect is a member of a group consisting of: physical health, mental health, self-fulfillment, career, education, social skills, mental skills, physical skills, and overall life impact.

10. The method of claim 1, further comprising adjusting the at least one quantified benefit value according to at least one user attribute relating to the at least one user, the at least one user attribute is a member of a group consisting of: a personal attribute, a geolocation attribute, and a timing attribute.

11. The method of claim 1, further comprising adjusting the selection of the at least one consumable item according to at least one user attribute relating to the at least one user, the at least one user attribute is a member of a group consisting of: a personal attribute, a geolocation attribute, a timing attribute, and a user setting.

12. The method of claim 1, further comprising adjusting the selection of the at least one consumable item according to at least one consumption pattern of the at least one user, the at least one consumption pattern is identified based on analysis of a plurality of previous recommendations of at least some of the plurality of consumable items to the at least one user.

13. The method of claim 1, further comprising adjusting the selection of the at least one consumable item according to a selection of the at least one consumable item for at least another one user sharing at least one common user attribute with the at least one user.

14. The method of claim 1, wherein the plurality of consumable items are members of a group consisting of: a text item, a visual item, an audio item, a product, a service, a travel destination, a residence destination, an experience, an activity, an opportunity, a living condition, and a neural stimulation.

15. The method of claim 1, further comprising transmitting at least one notification to the at least one user, the at least one notification is indicative of the at least one consumable item selected based on a correspondence between the at least one quantified benefit value of the at least one consumable item and at least one benefit parameter determined for the at least one user based on at least one previous session with the at least one user.

16. The method of claim 15, wherein transmitting the at least one notification to the at least one user is conducted without having to actively initiate a search by said user.

17. The method of claim 1, further comprising sharing a description of the at least one consumable item selected for recommendation to the at least one user with at least another one user.

18. A system for increasing performance of computerized web search by recommending online consumable items based on quantified benefit value instead of or in addition to linguistic based search, comprising:
a Graphical User Interface (GUI);
a memory for storing program code of a search engine; and at least one processor coupled to the memory, the at least one processor is configured to execute the program code, the program code comprising:
code instructions to display on said GUI a first plurality of visual elements, each reflecting a different quantified benefit value associated with at least one of a plurality of domains of interest;
code instructions to display on said GUI a second plurality of visual elements, each representing one of the plurality of domains of interest; code instructions to identify a combination of at least one benefit parameter and at least one of the plurality of domains of interest by detecting a selection of the at least one benefit parameter selected by at least one user with respect to at least one of the plurality of domains of interest and detect a drag and drop operation conducted by said at least one user on said GUI, dragging at least one first visual element of the first plurality of visual elements and dropping it over at least one second visual element of the second plurality of visual elements or vice versa, dragging the at least one second visual element and dropping it over the at least one first visual element;
code instructions to obtain from said drag and drop operation said combination of the selected at least one benefit parameter represented by said at least one first visual element and the selected at least one of the plurality of domains of interest represented by said at least one second visual element;
code instructions to conduct a search for a plurality of consumable items relating to the selected at least one of the plurality of domains of interest represented by said at least one second visual element by browsing a plurality of online resources using a value-based search based on quantified benefit values, wherein basing said search on said quantified benefit values increases an accuracy of said search engine and reduces computing resources used by said search engine;
code instructions to analyze a benefit label associated with each of the plurality of consumable items and the benefit label generated automatically based on analysis of content relating to plurality of consumable items using at least one machine learning model (ML) trained to compute the at least one quantified benefit value for the at least one consumable item based on content analysis and/or context analysis, the benefit label of each consumable item expresses linguistic content and/or context of the respective consumable item in at least one quantified benefit value expressed in at least one metric which is a member of a group consisting of: time value, monetary value, and life improvement value;
code instructions to select at least one of the plurality of consumable items based on a correspondence between the at least one quantified benefit value of the at least one consumable item and the selected at least one benefit parameter represented by said at least one first visual element; and
code instructions to instruct at least one client device used by the at least one user to present on said GUI the selected at least one consumable item for consumption by the at least one user.

* * * * *